(12) United States Patent
Sogo

(10) Patent No.: US 9,117,252 B2
(45) Date of Patent: Aug. 25, 2015

(54) INFORMATION PROCESSING DEVICE, TERMINAL, SERVER, AND METHOD FOR DATA TRANSFER

(75) Inventor: Takushi Sogo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 13/695,598

(22) PCT Filed: Apr. 27, 2011

(86) PCT No.: PCT/JP2011/060678
§ 371 (c)(1),
(2), (4) Date: Oct. 31, 2012

(87) PCT Pub. No.: WO2011/138972
PCT Pub. Date: Nov. 10, 2011

(65) Prior Publication Data
US 2013/0046719 A1    Feb. 21, 2013

(30) Foreign Application Priority Data

May 7, 2010   (JP) ................................. 2010-107073

(51) Int. Cl.
G06N 7/00    (2006.01)
G06F 9/45    (2006.01)
G06Q 99/00   (2006.01)
G06Q 10/10   (2012.01)
G06Q 10/04   (2012.01)

(52) U.S. Cl.
CPC .............. *G06Q 99/00* (2013.01); *G06F 8/4442* (2013.01); *G06N 7/005* (2013.01); *G06Q 10/04* (2013.01); *G06Q 10/10* (2013.01)

(58) Field of Classification Search
CPC .............................. G06N 7/005; G06F 8/4442
USPC .......................................................... 706/46
See application file for complete search history.

(56) References Cited

U.S. PATENT DOCUMENTS

| 5,881,231 A | 3/1999 | Takagi et al. |
| 6,243,755 B1 | 6/2001 | Takagi et al. |
| 2002/0194434 A1 | 12/2002 | Kurasugi |

FOREIGN PATENT DOCUMENTS

JP          8-241257 A          9/1996
(Continued)

OTHER PUBLICATIONS

Drakatos et al ("A context-aware cache structure for mobile computing environments" 2006).*
(Continued)

*Primary Examiner* — Lut Wong
(74) *Attorney, Agent, or Firm* — McGinn IP Law Group, PLLC

(57) ABSTRACT

An information processing device includes a first unit which predicts use data used in the future on the basis of action plan information resulting from prediction of an action of a user, and outputs use data identification information; a second unit which predicts a communication state in a situation indicated by the action plan information on the basis of the action plan information and communication environment information regarding a communication environment of the terminal, and outputs information regarding the predicted communication state; and a third unit which calculates a prefetch necessary degree regarding each of the use data on the basis of the use data identification information and the information regarding the predicted communication state.

32 Claims, 12 Drawing Sheets

(56) References Cited

FOREIGN PATENT DOCUMENTS

| | | |
|---|---|---|
| JP | 2002-373109 A | 12/2002 |
| JP | 2008-123325 A | 5/2008 |
| JP | 2008-199381 A | 8/2008 |

OTHER PUBLICATIONS

Burbey et al ("Predicting Future Locations Using Prediction-by-Partial-Match" 2008).*

International Search Report in PCT/JP2011/060678 dated Jun. 21, 2011(English Translation Thereof).

* cited by examiner

Fig. 3

630 ACTION PLAN LIST

| TIME | ACTION |
|---|---|
| 7:00~8:00 | MOVE (HOME TO OFFICE) |
| 7:00~8:00 | USE APPLICATION (Web: NEWS) |
| 9:00~9:30 | USE APPLICATION (MAIL) |
| 10:00~11:00 | USE APPLICATION (Web: TRANSFER SEARCH) |
| 12:00~13:00 | MOVE (OFFICE TO VISITING PLACE) |
| 12:00~13:00 | USE APPLICATION (Web: RESTAURANT SEARCH) |
| 12:00~13:00 | USE APPLICATION (Web: MAP) |
| 15:00~16:00 | USE APPLICATION (PRESENTATION) |
| 18:00~19:00 | MOVE (VISITING PLACE TO HOME) |
| 21:00~22:00 | USE APPLICATION (Web: NEWS) |

Fig. 4

631 USE DATA LIST

| UTILIZATION TIME | USE DATA IDENTIFICATION INFORMATION |
|---|---|
| 7:00~8:00 | TODAY'S NEWS ARTICLE |
| 9:00~9:30 | NEW ARRIVAL MAIL, MAIL WITHIN ONE WEEK DAY |
| 10:00~11:00 | RESULT OF SEARCHING OF TRANSFER FOR ROUTE FROM OFFICE TO VISITING PLACE |
| 12:00~13:00 | RESULT OF SEARCHING OF RESTAURANT AROUND VISITING PLACE |
| 12:00~13:00 | MAP DATA AROUND VISITING PLACE |
| 15:00~16:00 | PRESENTATION DATA |
| 21:00~22:00 | TODAY'S NEWS ARTICLE |

Fig. 5

632 USE DATA LIST

| UTILIZATION TIME | USE DATA IDENTIFICATION INFORMATION | DEGREE OF IMPORTANCE |
|---|---|---|
| 7:00~8:00 | TODAY'S NEWS ARTICLE | 0.9 |
| 9:00~9:30 | NEW ARRIVAL MAIL, MAIL WITHIN ONE WEEK DAY | 0.9 |
| 10:00~11:00 | RESULT OF SEARCHING OF TRANSFER FOR ROUTE FROM OFFICE TO VISITING PLACE | 0.5 |
| 12:00~13:00 | RESULT OF SEARCHING OF RESTAURANT AROUND VISITING PLACE | 0.5 |
| 12:00~13:00 | MAP DATA AROUND VISITING PLACE | 0.3 |
| 15:00~16:00 | PRESENTATION DATA | 1.0 |
| 21:00~22:00 | TODAY'S NEWS ARTICLE | 0.7 |

Fig. 6

633 COMMUNICATION STATE LIST

| UTILIZATION TIME | LOCATION | COMMUNICATION STATE (COMMUNICATION AVAILABLE TIME) |
|---|---|---|
| 7:00~8:00 | HOME TO OFFICE | 0.4 |
| 8:00~12:00 | OFFICE | 1.0 |
| 12:00~13:00 | OFFICE TO HOME | 0.7 |
| 13:00~18:00 | VISITING PLACE | 0.0 |
| 18:00~19:00 | VISITING PLACE TO HOME | 0.4 |
| 21:00~ | HOME | 1.0 |

Fig. 7

634 PREFETCH NECESSARY DEGREE

| CLOCK | USE DATA IDENTIFICATION INFORMATION | PREFETCH NECESSARY DEGREE |
|---|---|---|
| 7:00~8:00 | TODAY'S NEWS ARTICLE | 0.54 |
| 9:00~9:30 | NEW ARRIVAL MAIL, MAIL WITHIN ONE WEEK DAY | 0.0 |
| 10:00~11:00 | RESULT OF SEARCHING OF TRANSFER FOR ROUTE FROM OFFICE TO VISITING PLACE | 0.0 |
| 12:00~13:00 | RESULT OF SEARCHING OF RESTAURANT AROUND VISITING PLACE | 0.15 |
| 12:00~13:00 | MAP DATA AROUND VISITING PLACE | 0.09 |
| 15:00~16:00 | PRESENTATION DATA | 1.0 |
| 21:00~22:00 | TODAY'S NEWS ARTICLE | 0.0 |

Fig. 8

635 DECISION TABLE

| COMMUNICATION QUALITY / DEGREE OF IMPORTANCE | HIGH | MIDDLE | LOW |
|---|---|---|---|
| HIGH | MIDDLE | MIDDLE | HIGH |
| MIDDLE | LOW | MIDDLE | MIDDLE |
| LOW | LOW | LOW | MIDDLE |

Fig. 9

636 EXTRACTION LIST

| CLOCK | USE DATA IDENTIFICATION INFORMATION | PREFETCH NECESSARY DEGREE |
|---|---|---|
| 7:00~8:00 | TODAY'S NEWS ARTICLE | 0.54 |
| 15:00~16:00 | PRESENTATION DATA | 1.0 |

Fig. 12

637 PLANNING LIST

| USE DATA IDENTIFICATION INFORMATION | PREFETCH NECESSARY DEGREE | ACQUISITION LIMIT TIME | EXPECTED ACQUISITION PERIOD (MINUTE) | ACQUISITION START TIME |
|---|---|---|---|---|
| TODAY'S NEWS ARTICLE | 0.54 | 6:55 | 10 | 6:35 |
| PRESENTATION DATA | 1.0 | 11:55 | 1 | 9:53 |
| RESULT OF SEARCHING OF RESTAURANT AROUND VISITING PLACE | 0.15 | 11:55 | 30 | 9:55 |
| MAP DATA AROUND VISITING PLACE | 0.09 | 11:55 | 30 | 10:55 |

INFORMATION PROCESSING DEVICE, TERMINAL, SERVER, AND METHOD FOR DATA TRANSFER

TECHNICAL FIELD

The present invention relates to an information processing device, a terminal, a server and a method for data transfer, and in particular, it relates to an information processing device, a terminal, a server and a method for data transfer which allow transfer of data in advance of the time when the data is required.

BACKGROUND ART

In systems which allow mobile terminals to provide services by communicating with servers via wireless communication, in zones where radio waves do not reach such mobile terminals sufficiently (i.e., in so-called blind zones), the communication becomes unstable or is sometimes interrupted, so that a situation in which it is difficult to continue the provision of the services sometimes occurs. As one of methods to deal with such a situation, there has been a method in which data assumed to be used by a certain mobile terminal is transferred from a relevant server to the mobile terminal in advance of the time when relevant communication is interrupted (i.e., a prefetched operation is performed).

In Patent Document 1 below, an example of data prefetch systems related to such methods is described. This data prefetch system operates as follows.

First, a use state prediction unit predicts pieces of data which are assumed to be used by a terminal (assumed to be used by a user thereof) in the future on the basis of histories of user actions, a schedule of the day and the like. Next, an allocation method control unit executes scheduling of data prefetch processes on the basis of the prediction result, and costs incurred by cache processes, such as communication charges. Next, the allocation method control unit acquires the pieces of data stored in relevant servers and performs caching into the mobile terminal on the basis of the scheduling result.

Further, in Patent Document 2 below, another example of the related data prefetch systems is described. In this data prefetch system, the increase of entire data-transfer amount is restrained by sorting out and prefetching only pieces of data each having a high possibility of being used (i.e., pieces of data each having a high degree of importance).

PATENT DOCUMENT

[Patent Document 1] Japanese Unexamined Patent Application Publication No. 8-241257
[Patent Document 2] Japanese Unexamined Patent Application Publication No. 2002-373109

SUMMARY OF THE INVENTION

Problem to be Solved by the Invention

In the above-described related technologies, there has been a problem that it is difficult to obtain an appropriate determination criterion which is used when sorting out data having a high necessity of prefetch.

The reason thereof is that the state of availability of a data transfer function (for example, the state of a network) in a situation in which relevant data is predicted to be used (the situation being, for example, a time, a location or the like) is not taken into consideration.

The above-described problem will be described specifically.

For example, sometimes, it is determined on the basis of a determination criterion that part of prefetch candidate data is not to be cached because of the restriction of a storage capacity for caching at the prefetch execution side. In such a case, the prefetch candidate data having been determined not to be cached is likely to contain data whose degree of necessity of caching is so high that the caching is originally to be performed.

Further, for example, because of the restriction of a communication rate of a relevant network, sometimes, it takes much time to complete prefetch processing regarding prefetch candidate data which has been determined to be cached on the basis of a determination criterion. In such a case, a situation in which the prefetch processing is not completed in time, so that a necessary part of the prefetch candidate data is not cached is likely to occur.

That is, in general, such a determination criterion that determines that, in the case where a relevant network is available at the time when certain data is used, the degree of necessity of caching the data by means of a prefetch is low even if the degree of importance (the possibility of being used) regarding the data is high, is acceptable. However, in the above-described related data prefetch systems, the determination criterion, which determines whether a prefetch of given data is to be performed, or not, does not take into consideration any situation in which the data is predicted to be used. For this reason, as a result, the above-described related data prefetch systems determine that data having a low necessity of prefetch is to be prefetched, or determines that data having a high necessity of prefetch is to be postponed.

The object of the present invention is to provide an information processing device, a terminal, a server and a method for data transfer which enable solution of the problem described above.

Means for Solving a Problem

An information processing device according to a first aspect of the invention includes a use data prediction unit which predicts use data that is assumed to be used by a terminal in the future on the basis of action plan information resulting from prediction of an action of a user of the terminal, and outputs use data identification information for identifying the predicted use data; a communication state prediction unit which predicts a communication state in a situation indicated by the action plan information on the basis of the action plan information and communication environment information regarding a communication environment of the terminal, and outputs information regarding the predicted communication state; and a prefetch necessary degree calculation unit which calculates a prefetch necessary degree regarding each of the use data on the basis of the use data identification information and the information regarding the predicted communication state.

A terminal according to a second aspect of the invention includes a use data prediction unit which predicts use data that is assumed to be used by the terminal in the future on the basis of action plan information resulting from prediction of an action of a user of the terminal, and outputs use data identification information for identifying the predicted use data; a communication state prediction unit which predicts a communication state in a situation indicated by the action plan information on the basis of the action plan information and communication environment information regarding a communication environment of the terminal, and outputs information regarding the predicted communication state; and a prefetch necessary degree calculation unit which calculates a prefetch necessary degree regarding each of the use data on the basis of the use data identification information and the information regarding the predicted communication state.

A server according to a third aspect of the invention includes a use data prediction unit which predicts use data that is assumed to be used by a terminal in the future on the basis of action plan information resulting from prediction of an action of a user of the terminal, and outputs use data identification information for identifying the predicted use data; a communication state prediction unit which predicts a communication state in a situation indicated by the action plan information on the basis of the action plan information and communication environment information regarding a communication environment of the terminal, and outputs information regarding the predicted communication state; and a prefetch necessary degree calculation unit which calculates a prefetch necessary degree regarding each of the use data on the basis of the use data identification information and the information regarding the predicted communication state.

A method for data transfer according to a fourth aspect of the present invention includes a step of predicting use data that is assumed to be used by a terminal in the future on the basis of action plan information resulting from prediction of an action of a user of the terminal, and outputting use data identification information for identifying the predicted use data; a step of predicting a communication state in a situation indicated by the action plan information on the basis of the action plan information and communication environment information regarding a communication environment of the terminal, and outputting information regarding the predicted communication state; and a step of calculating a prefetch necessary degree regarding each of the use data on the basis of the use data identification information and the information regarding the predicted communication state.

A non-transitory computer-readable recording medium in which a program recorded, according to a fifth aspect of the present invention, causes a computer to execute processing including a process of predicting use data that is assumed to be used by a terminal in the future on the basis of action plan information resulting from prediction of an action of a user of the terminal, and outputting use data identification information for identifying the predicted use data; a process of predicting a communication state in a situation indicated by the action plan information on the basis of the action plan information and communication environment information regarding a communication environment of the terminal, and outputting information regarding the predicted communication state; and a process of calculating a prefetch necessary degree regarding each of the use data on the basis of the use data identification information and the information regarding the predicted communication state.

An information processing device according to a sixth aspect of the invention includes use data prediction means for predicting use data that is assumed to be used by a terminal in the future on the basis of action plan information resulting from prediction of an action of a user of the terminal, and outputting use data identification information for identifying the predicted use data; communication state prediction means for predicting a communication state in a situation indicated by the action plan information on the basis of the action plan information and communication environment information regarding a communication environment of the terminal, and outputting information regarding the predicted communication state; and prefetch necessary degree calculation means for calculating a prefetch necessary degree regarding each of the use data on the basis of the use data identification information and the information regarding the predicted communication state.

Effect of the Invention

The present invention yields an advantageous effect in that it is possible to obtain an appropriate determination criterion which enables sorting of more pieces of data each having a high necessity of a prefetch more promptly.

BRIEF DESCRIPTION OF THE DRAWINGS

FIG. 3 is a diagram illustrating a structure of an action plan list and an example thereof in a first exemplary embodiment according to the present invention.

FIG. 4 is a diagram illustrating a structure of a use data list and an example thereof in a first exemplary embodiment according to the present invention.

FIG. 5 is a diagram illustrating a structure of a use data list to which a degree of importance is added, and an example thereof, in a first exemplary embodiment according to the present invention.

FIG. 6 is a diagram illustrating a structure of a communication state list in first and second exemplary embodiments according to the present invention.

FIG. 7 is a diagram illustrating a structure of a necessity-of-prefetch list and an example thereof in first and second exemplary embodiments according to the present invention.

FIG. 8 is a diagram illustrating a structure of a decision table and an example thereof in a first exemplary embodiment according to the present invention.

FIG. 9 is a diagram illustrating a structure of an extraction list and an example thereof in second and third exemplary embodiments according to the present invention.

FIG. 12 is a diagram illustrating a structure of a planning list and an example thereof in a second exemplary embodiment according to the present invention.

EXEMPLARY EMBODIMENTS FOR CARRYING OUT OF THE INVENTION

First Exemplary Embodiment

Figure 1:
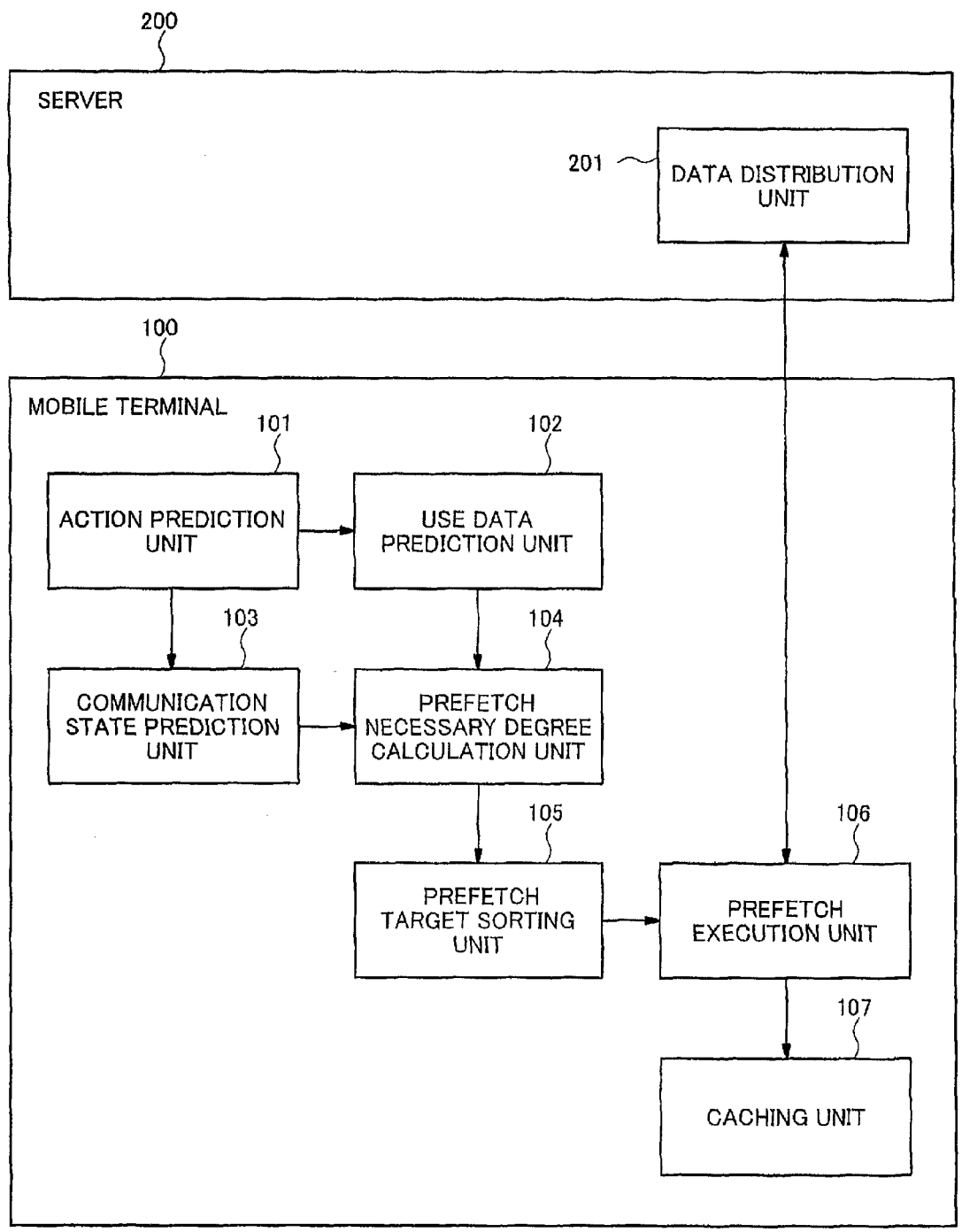
FIG. 1 is a block diagram illustrating a configuration of a first exemplary embodiment according to the present invention.

FIG. 1 is a block diagram illustrating a configuration of a first exemplary embodiment according to the present invention. Referring to FIG. 1, an information processing device according to this exemplary embodiment includes a mobile terminal 100 and a server 200.

The mobile terminal 100 includes an action prediction unit 101, a use data prediction unit 102, a communication state prediction unit 103, a prefetch necessary degree calculation unit 104, a prefetch target sorting unit 105, a prefetch execution unit 106 and a caching unit 107. Each of these units may be constituted by a computer including a CPU and a nonvolatile storage medium. In this case, the storage medium may store a program therein with which the computer causes the each unit to function.

The server 200 includes a data distribution unit 201. This data distribution unit 201 may be also constituted by a computer.

The mobile terminal 100 and the server 200 are connected to each other via a communication path (not illustrated) which is likely to cause communication thereon to be interrupted. This communication path may be configured so as to be appropriately sorted out from among a plurality of communication paths.

For example, the communication path may be configured such that, when a user of the mobile terminal 100 is at home or office, a wired connection is used, and while the terminal user is moving by train or car, a wireless connection is used. Basically, the wired connection is unlikely to be interrupted; while, regarding the wireless connection, its communication rate is different depending on a communication path being used. Further, communication is likely to be interrupted depending on its location, such as an underground area or an inside of a tunnel. Moreover, for example, while the user of the mobile terminal 100 is moving by airplane, or the like, any communication paths are unlikely to exist depending on its situation.

The action prediction unit 101 predicts actions of the user of the mobile terminal 100, such as contents of future operations, and movement destinations. Information regarding these predicted actions is also referred to as action plan information. The action prediction unit 101 stores and outputs this action plan information.

This action plan information may be data included in a action plan list. Further, for the prediction, the action prediction unit 101 uses operation histories and movement histories of the mobile terminal 100, and schedules of the user. In addition, the operation histories and the movement histories of the mobile terminal 100 and the schedules of the user are also referred to as prediction reference information. These pieces of prediction reference information are pieces of data each of which is stored into a memory unit, not illustrated in the mobile terminal 100 portion, in conjunction with any of operations and movements of the mobile terminal 100.

The use data prediction unit 102 predicts pieces of use data, which are pieces of data assumed to be used in the future by applications (not illustrated) of the mobile terminal 100, on the basis of the actions of the user, having been predicted by the action prediction unit 101 (i.e., the action plan information). Next, the use data prediction unit 102 outputs pieces of use data identification information corresponding to the respective predicted pieces of use data. Hereinafter, this use data assumed to be used in the future will be also described as prefetch candidate data.

The use data prediction unit 102 stores and outputs the pieces of use data identification information for identifying the corresponding predicted pieces of use data (pieces of prefetch candidate data).

The communication state prediction unit 103 predicts future communication states regarding the mobile terminal 100 on the basis of information regarding communication environments which is possessed in advance, and the actions of the user which have been predicted by the action prediction unit 101. Next, the communication state prediction unit 103 outputs pieces of data regarding the predicted communication states.

The information regarding communication environments is a list which indicates, for example, the availability and the communication rate of each of network connection services at the user's home, floors and meeting rooms of an office, stations, stores and the like. Further, the information regarding communication environments is, for example, a map indicating service areas for mobile phones, a map indicating tunnels and underground portions of roads and railways, and the like. In addition, the information regarding communication environments may be information which the mobile terminal 100 has received from a certain network and has stored into itself.

The prefetch necessary degree calculation unit 104 calculates the prefetch necessary degrees prefetch regarding respective pieces of use data on the basis of the pieces of prefetch candidate data having been predicted by the use data prediction unit 102, and the future communication states (data regarding the communication states) having been predicted by the communication state prediction unit 103. Next, the prefetch necessary degree calculation unit 104 outputs the calculated prefetch necessary degrees prefetch regarding respective pieces of use data.

The prefetch target sorting unit 105 sorts out pieces of use data that are to be targeted for prefetch on the basis of the prefetch necessary degrees regarding respective pieces of use data, having been calculated by the prefetch necessary degree calculation unit 104. Next, the prefetch target sorting unit 105 outputs pieces of use data identification information corresponding to the respective sorted-out pieces of use data.

The prefetch execution unit 106 acquires the pieces of use data having been sorted out by the prefetch target sorting unit 105, from the data distribution section 201 of the server 200, on the basis of the pieces of use data identification information. Next, the prefetch execution unit 106 stores the acquired pieces of use data into the caching unit 107.

The pieces of use data having been stored in the caching unit 107 is each used by any of the applications (not illustrated) of the mobile terminal 100.

Next, operations of this exemplary embodiment will be described in detail with reference to FIGS. 1 to 9 by indicating specific examples.

Figure 2:
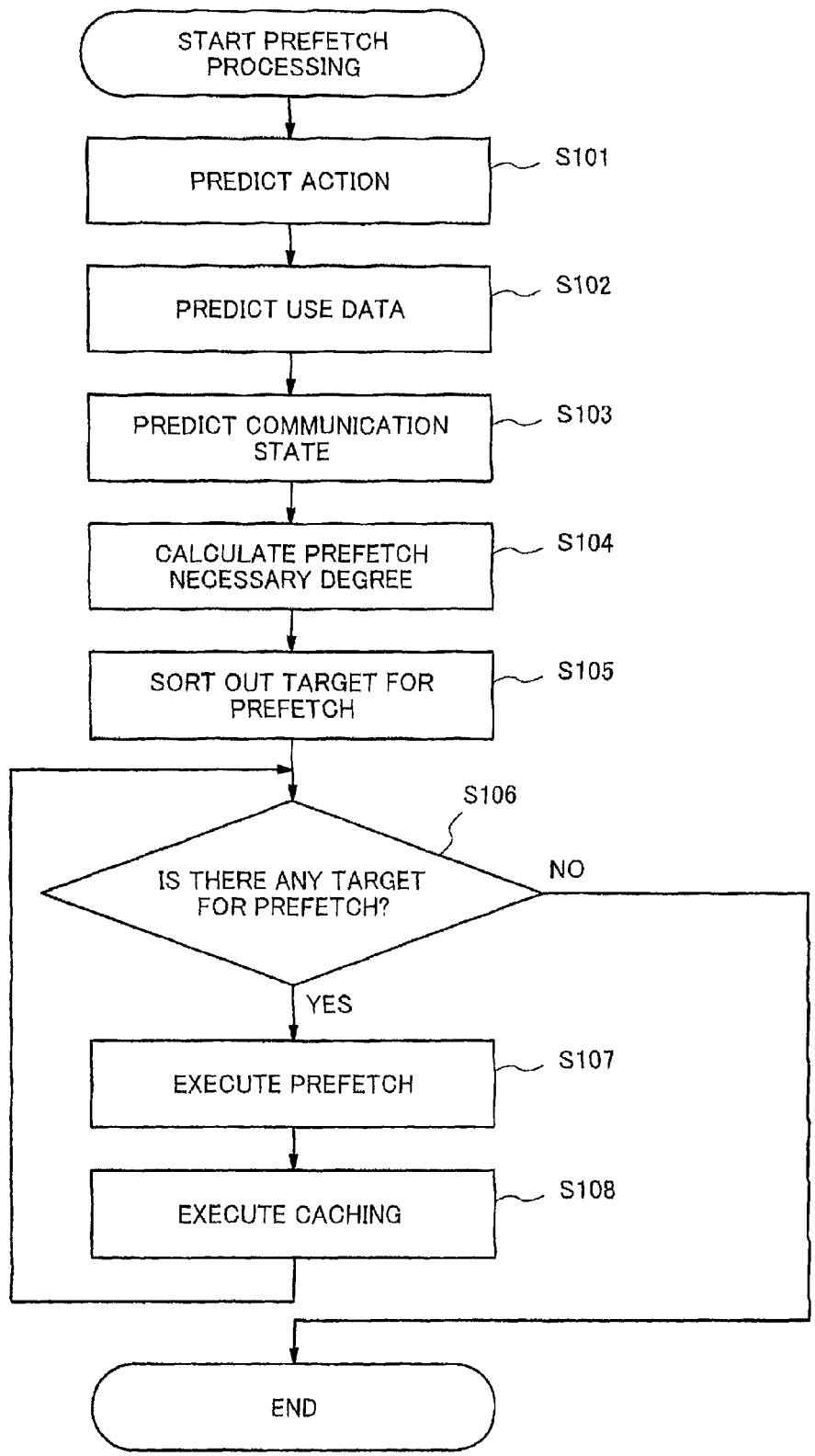
FIG. 2 is a flowchart illustrating the entire operations of a first exemplary embodiment according to the present invention.

FIG. 2 is a flowchart illustrating the entire operations of this exemplary embodiment.

First, the action prediction unit 101 predicts actions of a user of the mobile terminal 100, such as contents of future operations, and movement destinations, and creates and outputs an action plan list 630 shown in FIG. 3 (step S101 of FIG. 2). FIG. 3 is a diagram illustrating the structure of the action plan list 630 and an example thereof. As shown in FIG. 3, the action plan list 630 includes at least one pair of a time and an action corresponding to the time.

Referring to the example shown in FIG. 3, the action plan list 630 indicates predictions, such as a prediction in which the user will move from home to office during from 7:00 to 8:00, and a prediction in which the user will use a mail application provided by the mobile terminal 100 during from 9:00 to 9:30. In addition, in the action plan list 630, as shown in the example of FIG. 3, the respective times corresponding to a plurality of actions may be duplicated.

The action prediction unit 101 may accumulate in advance operation histories of the mobile terminal 100 and movement histories, in the past of the user, and on the basis of these histories, the action prediction unit 101 may predict a future action. Further, the action prediction unit 101 may predict a future action on the basis of a current time, a current position of the user and a current situation of the user.

The current situation regarding the user is, for example, a situation in which, since the mobile terminal 100 is connected to a network provided in the user's office, the user is at office, a situation in which, since the mobile terminal 100 is set to a driving mode, the user is driving a car, or the like. In addition, each of the current time, the current position of the user and the current situation of the user is also referred to as prediction reference information.

Further, the action prediction unit 101 may predict a future action on the basis of the day's schedule of the user. Further, in the case of the mobile terminal 100 having a navigation function, the action prediction unit 101 may predict a future action by regarding a currently conducted path indicated by the navigation function as a future movement path as it is (which is also referred to as prediction reference information).

Moreover, by presenting the action plan list 630 having been predicted in such a way as described above to the user, when necessary, on the basis of correction information thereon from the user (which is also referred to as prediction reference information), the action prediction unit 101 may create the action plan list 630.

Further, the action prediction unit 101 may create the action plan list 630 on the basis of information having been specifically set by the user (which is also referred to as prediction reference information), for example, 'being at office during this period of time', 'moving by train at this time', or the like.

Next, on the basis of the action plan list 630 having been created by the action prediction unit 101, the use data prediction unit 102 predicts pieces of use data which are assumed to be used in the future by applications (not illustrated) of the mobile terminal 100, and creates and outputs a use data list 631 shown in FIG. 4 (step S102).

FIG. 4 is a diagram illustrating the structure of the use data list 631 and an example thereof. As shown in FIG. 4, the use data list 631 includes at least one pair of a utilization time and a piece of use data identification information corresponding to the use time.

Referring to the example shown in FIG. 4, the use data list 631 indicates the pieces of use data identification information corresponding to the respective pieces of use data, which have been predicted to be used by any of the applications of the mobile terminal 100, along the times. In addition, the individual pieces of use data identification information shown in FIG. 4 indicate classes of use data, but the classes may be codes corresponding thereto.

The use data list 631 indicates that, for example, the use data prediction unit 102 has predicted that new arrival mails and mails within one week will be used during from 9:00 to 9:30. In this case, the use data prediction unit 102 has predicted above on the basis of 'use application (mail)' corresponding to a time '9:00 to 9:30' on the action plan list 630 shown in FIG. 3.

Further, the use data list 631 indicates that, for example, the use data prediction unit 102 has predicted that the results of searching of transfers for a route from office to a visiting place will be used during from 10:00 to 11:00. In this case, the use data prediction unit 102 predicts above on the basis of 'use application (Web: transfer search)' corresponding to a time '10:00 to 11:00' on the action plan list 630 shown in FIG. 3.

In addition, the use data prediction unit 102 may calculate the degrees of importance regarding respective pieces of use data on the basis of a prescribed criterion (for example, a degree of importance having been determined for each class of applications or for each class of use data).

FIG. 5 is a diagram illustrating the structure of the use data list 632 including the degree of importance added thereto, and an example thereof. The degree of importance on the use data list 632 means that the larger the value thereof becomes, the more highly a relevant application is likely to utilize use data indicated by corresponding use data identification information on the use data list 632. Alternatively, the degree of importance on the use data list 632 means that the larger the value thereof becomes, the larger the loss of the user becomes when a relevant application cannot use the use data.

In addition, the degree of importance may be represented by quantitative information such as a value representing the possibility of use, or may be represented by qualitative information such as 'high, middle or low'.

Next, on the basis of the action plan list 630 having been created by the action prediction unit 101 and information regarding communication environments, the communication state prediction unit 103 predicts future communication states of the mobile terminal 100, and creates and outputs a communication state list 633 shown in FIG. 6 (step S103).

When predicting the communication states, information regarding communication environments, such as a service area map for mobile phones and sections of tunnels and underground portions regarding roads and railways, is used.

FIG. 6 is a diagram illustrating the structure of the communication state list 633 and an example thereof. As shown in FIG. 6, the communication state list 633 includes at least one combination of a time, a location, and a communication state (communication available time) corresponding thereto.

Referring to the example shown in FIG. 6, on the basis of a location of the mobile terminal 100 at each time, the communication state list 633 indicates a communication state at the location (when moving, which is a midway point on a path of the movement) in the form of a proportion of time when communication is available. For example, the communication state (communication available time) '0.4' on the communication state list 633 means that 'communication is available during the 40 percent of time' within a range between corresponding times.

The communication state prediction unit 103 sets the individual communication states to, for example, '0.4' when on the movement path between home and office, '1.0' when inside office, and '0.7' when on the path between office and a visiting place.

The communication state (communication available time) of the communication state list 633 may be represented by quantitative information such as an intensity of a radio wave or an available communication rate, or may be represented by qualitative information such as 'good', not good or unavailable'.

Next, the prefetch necessary degree calculation unit 104 calculates the prefetch necessary degrees regarding respective pieces of use data on the basis of the use data list 631 or the use data list 632, and the communication state list 633. Subsequently, the prefetch necessary degree calculation unit 104 creates and outputs the prefetch necessary degree list 634 shown in FIG. 7 on the basis of the calculated prefetch necessary degrees regarding respective pieces of use data (step S104).

FIG. 7 is a diagram illustrating the structure of the prefetch necessary degree list 634 and an example thereof. As shown in FIG. 7, the prefetch necessary degree list 634 includes at least one combination of a time, a piece of use data identification information and a prefetch necessary degree.

Referring to the example shown in FIG. 7, the prefetch necessary degree list 634 indicates pieces of use data identification information regarding respective pieces of use data which are likely to be used, and corresponding prefetch necessary degrees, along times. In addition, the prefetch necessary degree may be represented by quantitative information such as a value of the probability of referring to corresponding use data on the cache, or may be represented by qualitative information such as 'high, middle or low'.

In addition, in the case where a use data list created by the use data prediction unit 102 is the use data list 632 shown in FIG. 5, the prefetch necessary degree calculation unit 104 may calculate the prefetch necessary degrees on the prefetch necessary degree list 634 on the basis of the corresponding degrees of importance on the use data list 632, in addition to the corresponding communication states (communication available times) on the communication state list 633. A specific example will be described. For example, it is assumed that a degree of importance on the use data list 632 is denoted by P, and a communication state (communication available time) on the communication state list 633 is denoted by Q. When P and Q each take a real number within the range of '0' to '1' quantitatively, the prefetch necessary degree calculation unit 104 calculates a corresponding prefetch necessary degree R on the prefetch necessary degree list 634 by using a formula: $R = P \times (1-Q)$.

That is, the higher the degree of importance on the use data list 632 becomes and the poorer the communication state (communication available time) on the communication state list 633 becomes, the larger the prefetch necessary degree on the prefetch necessary degree list 634 becomes. The individual prefetch necessary degrees shown in FIG. 7 are ones having been calculated by using the above-described formula.

Further, in the case where P and Q are each represented by qualitative information such as 'high, middle or low', for example, calculations using a decision table 635 shown in FIG. 8 can be performed. FIG. 8 is a diagram illustrating the structure of the decision table 635 and an example thereof. As shown in FIG. 8, the decision table 635 includes a matrix of P and Q each being represented by qualitative information.

Next, on the basis of the prefetch necessary degree list 634 and a prescribed determination criterion, the prefetch target sorting unit 105 determines whether a prefetch of each of pieces of use data corresponding to the respective pieces of use data identification information on the prefetch necessary degree list 634 is to be performed, or not. Next, the prefetch target sorting unit 105 creates an extraction list 636 shown in FIG. 9 (step S105).

For example, the prescribed determination criterion may allow pieces of use data each corresponding to a degree of necessity smaller than or equal to a preset threshold value to be out of targets for prefetch. Further, for example, the prescribed determination criterion may allow pieces of use data, the number of which is equivalent to a certain proportion (for example, 20 percent) of the total number of targets for prefetch, to be out of the targets for prefetch in order starting from a piece of used data corresponding to the lowest prefetch necessary degree of those on the prefetch necessary degree list 634.

Further, for example, operations based on the prescribed determination criterion may be the following operations. First, the prefetch target sorting unit 105 acquires a data size of to do prefetch, having been appropriately set in advance by taking account a cache capacity (for example, the data size of prefetch being equivalent to the 50 percent of the cache capacity). Further, in order that the total of a data size of each piece of use data targeted for prefetch can be within the data size of to prefetch, the prefetch target sorting unit 105 makes pieces of use data be out of targets for prefetch in order starting from a piece of use data corresponding to the lowest prefetch necessary degree among pieces of use data corresponding to the respective pieces of use data identification information included in the prefetch requirement list 634.

FIG. 9 is a diagram illustrating the structure of the extraction list 636 and an example thereof. As shown in FIG. 9, the extraction list 636 includes at least one combination of a time, a piece of use data identification information and a prefetch necessary degree, which has been extracted from the prefetch necessary degree list 634 as a target for prefetch.

Referring to the example shown in FIG. 9, the extraction list 636 indicates an example including cases which have been extracted with a condition of being larger than or equal to a threshold value of 0.3 regarding the prefetch necessary degrees on the prefetch necessary degree list 634.

Finally, the prefetch execution unit 106 acquires pieces of use data from the data distribution unit 201 of the server 200 on the basis of the extraction list 636 having been created by the prefetch target sorting unit 105 (steps S106 to S107). Next, the prefetch execution unit 106 stores the acquired pieces of use data into the caching unit 107 (step S108). The prefetch execution unit 106 repeats steps S106 to S108 until the completion of acquisition of all the pieces of use data, for each of which the prefetch target sorting unit 105 has determined that a prefetch is to be executed.

In addition, in the case where the mobile terminal 100 is configured not to incorporate any application programs in advance, but to download them to the mobile terminal 100 from the server 200 to use them, the mobile terminal 100 may execute prefetch of not only the pieces of use data, but also the application programs. That is, in the case where a prediction in that a specific application will be used is indicated on the action plan list 630, in the above-described step S106, the mobile terminal 100 may perform the following processing. First, the mobile terminal 100 acquires a relevant application program from the server 200. Next, the mobile terminal 100 may store the acquired application program into the caching unit 107.

Further, in steps S106 to S107, the mobile terminal 100 may perform prefetch processing in order starting from a piece of use data corresponding to the highest prefetch necessary degree. In this way, even in the case where a relevant network is disconnected while performing a prefetch process, so that the prefetch process is aborted, it is possible to lower the probability of occurrence of a problem that a relevant application halts because required pieces of use data are not prefetched sufficiently.

In steps S106 to S107, the mobile terminal 100 may prefetch pieces of use data in order starting from a piece of use data corresponding to the highest prefetch necessary degree of those on the prefetch necessary degree list 634, without causing the prefetch target sorting unit 105 to extract targets for prefetch in step S105. In this case, by stopping the prefetch processing at timing when there is no available capacity in the cache, it is possible to prefetch pieces of use data each having a high prefetch necessary degree to an extent that allows the data amount of the pieces of use data to be within a cache size.

An advantageous effect of this exemplary embodiment described above is that it is possible to prefetch more pieces of use data, each having a high necessity of prefetch, more promptly.

The reason thereof is that, processing has been improved such that the prefetch processes are performed on the basis of the prefetch necessary degrees resulting from calculation performed by the prefetch necessary degree calculation unit 104 regarding pieces of prefetch candidate data having been predicted by the use data prediction unit 102, and referring to future communication states having been predicted by the communication state prediction unit 103.

Second Exemplary Embodiment

Next, a second exemplary embodiment according to the present invention will be described in detail with reference to the drawings.

Figure 10:
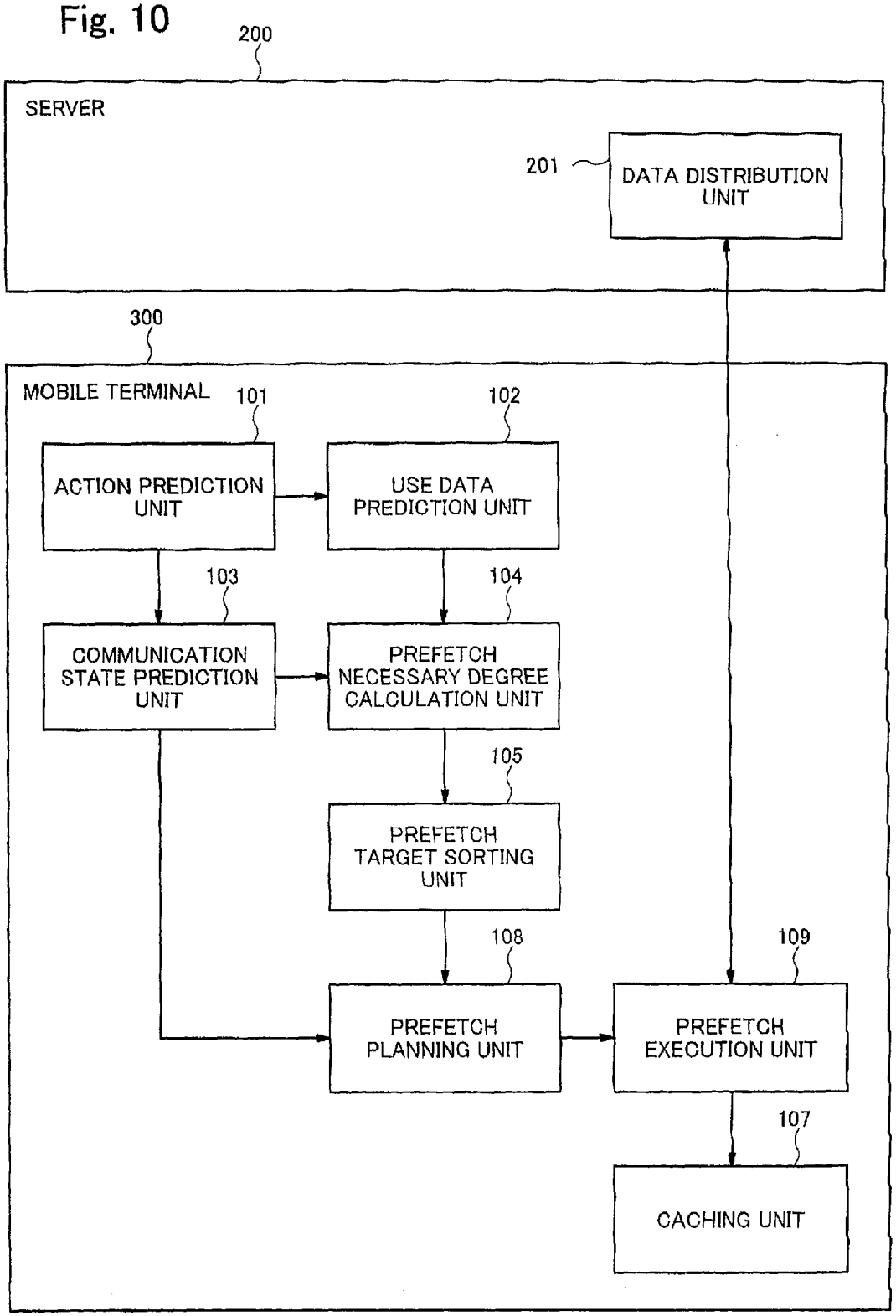
FIG. 10 is a block diagram illustrating a configuration of a second exemplary embodiment according to the present invention.

FIG. 10 is a block diagram illustrating a configuration of the second exemplary embodiment according to the present invention. Referring to FIG. 10, an information processing device according to this exemplary embodiment includes a mobile terminal 300 and a server 200.

As compared with the configuration of the mobile terminal 100 shown in FIG. 1, according to the first exemplary embodiment, the mobile terminal 300 is configured such that the prefetch planning unit 108 is added, and the prefetch execution unit 106 is replaced by a prefetch execution unit 109. The mobile terminal 300 is configured in the same configuration as that of the first exemplary embodiment except for the addition of the prefetch planning unit 108 and the replacement of the prefetch execution unit 106 to the prefetch execution unit 109, and the same components are denoted by the same symbols.

The prefetch planning unit 108 plans the order and the timing of acquisition of the pieces of use data, which the prefetch target sorting unit 105 has determined to prefetch and has sorted out, from the server 200 on the basis of the future communication states having been predicted by the communication state prediction unit 103.

The prefetch execution unit 109 acquires the pieces of use data from the data distribution section 201 of the server 200 on the basis of the prefetch plan having been determined by the prefetch planning unit 108, and stores the acquired pieces of use data into the caching unit 107.

In addition, the prefetch planning unit 108 and the prefetch execution unit 109 may be each configured as part of functions of the computer.

Next, operations of this exemplary embodiment will be described in detail with reference to FIG. 6, FIG. 7, FIG. 9 and FIGS. 10 to 12 by indicating specific examples.

Figure 11:
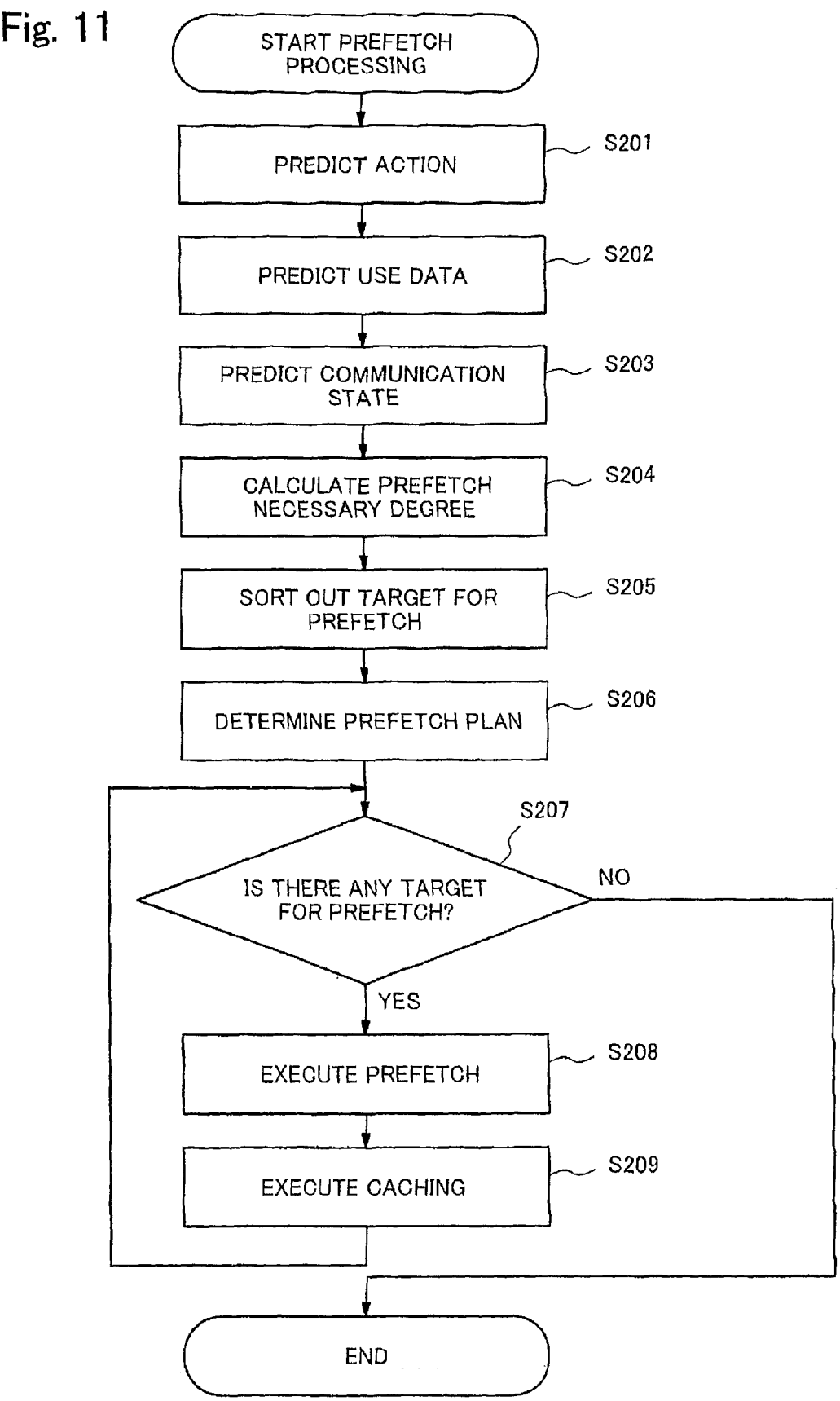
FIG. 11 is a flowchart illustrating the entire operations of a second exemplary embodiment according to the present invention.

FIG. 11 is a flowchart illustrating the entire operations of this exemplary embodiment.

Steps S201 to S205 shown in FIG. 11 are the same as steps S101 to S105 of the first exemplary embodiment, shown in FIG. 2, and thus, the descriptions thereof are omitted.

On the basis of the future communication states having been predicted by the communication state prediction unit 103, the prefetch planning unit 108 plans times at which the corresponding pieces of use data, which are indicated on the extraction list 636 shown in FIG. 9, having been created by the prefetch target sorting unit 105, are to be acquired from the server 200. Subsequently, the prefetch planning unit 108 creates and outputs a planning list 637 on the basis of the planned acquisition times (step S206).

For example, the prefetch planning unit 108 obtains acquisition start times for respective pieces of use data on the basis of the sizes of the respective pieces of use data on the extraction list 636, and the communication states (communication available time) on the communication state list 633 at the respective times on the extraction list 636, and the like. The acquisition start time is a time which makes it possible for the prefetch execution unit 109 to, in advance of a utilization time for each of the pieces of use data on the extraction list 636, complete a prefetch process of the each of the pieces of use data. In this case, the prefetch planning unit 108 plans so that the pieces of use data can be acquired in order starting from a piece of use data corresponding to the highest degree of importance among the pieces of use data corresponding to the respective pieces of use data identification information on the prefetch necessary degree list 634.

FIG. 12 is a diagram illustrating the structure of the planning list 637 and an example thereof. As shown in FIG. 12, the planning list 637 includes at least one combination of a piece of use data identification information, a prefetch necessary degree, an acquisition limit time, an expected acquisition period (minute) and an acquisition start time.

Referring to the example shown in FIG. 12, the planning list 637 is scheduled so as to satisfy such prefetch conditions that the acquisition of each piece of use data is to be completed five minutes in advance of the start of its use, or five minutes in advance of its acquisition unavailable time, and further, it takes at most two times the period which is assumed to be necessary to complete the acquisition thereof. The acquisition unavailable time is, for example, a time when a relevant network is completely blocked, a time when a stable network becomes unavailable, or the like. In addition, such scheduling processing is described in, for example, PTL 2, and thus, the details thereof are omitted from this description.

Finally, the prefetch execution unit 109 acquires pieces of use data from the data distribution section 201 of the server 200 on the basis of the planning list 637 having been created by the prefetch planning unit 108 (steps S207 to S208). And stores the acquired pieces of use data into the caching unit 107 (step S209). The prefetch execution unit 109 repeats the processes of steps S207 to S209 until the completion of acquisition and caching of all the pieces use data listed on the planning list 637.

In addition, in the case where, in step S206, such a scheduling that satisfies the above-described prefetch conditions cannot be performed, that is, in the case where it is presumed that some of the prefetch processes cannot be completed in time, the prefetch execution unit 109 may exclude some of pieces of use data from the targets for prefetch in order starting from a piece of use data corresponding to the lowest prefetch necessary degree of those on the planning list 637. Alternatively, the operations of the mobile terminal 300 may be altered such that, the process flow is caused to return to step S205, where a process of reducing the number of the targets for prefetch by changing the threshold value and executing the sorting of targets for prefetch again is performed.

In addition, in step S206, the prefetch planning unit 108 may create the planning list 637 which allows a space to be allocated between any two successive prefetch processes so that, when performing prefetch processes for a plurality pieces of use data, the processes do not put a lot of strain on a relevant network and the server 200. Further, regarding some pieces of use data which are frequently updated, the prefetch planning unit 108 may create the planning list 637 such that timing at which each of prefetch processes is performed does not become too early.

A first advantageous effect of this exemplary embodiment described above is that, in addition to the advantageous effect of the first exemplary embodiment, in the case where the number of pieces of use data targeted for prefetch is too large when taking into account corresponding assumed states of relevant networks, by reducing the number of the targets for prefetch, it is possible to complete each of prefetch processes with certainty in advance of the time when a corresponding piece of use data is used.

The reason thereof is that processing is improved such that the prefetch planning unit 108 and the prefetch execution unit 109 perform control of the timing at which each of pieces of use data having been sorted out by the prefetch target sorting unit 105 is acquired from the server 200.

A second advantageous effect of this exemplary embodiment described above is that it is possible to prevent the occurrence of a situation in which a lot of strain is put on a relevant network and the server 200, and a situation in which a prefetch process for a certain piece of use data is performed earlier than required timing thereof.

The reason thereof is the same as that of the first advantageous effect.

Third Exemplary Embodiment

Next, a third exemplary embodiment according to the present invention will be described in detail with reference to the drawings.

Figure 13:
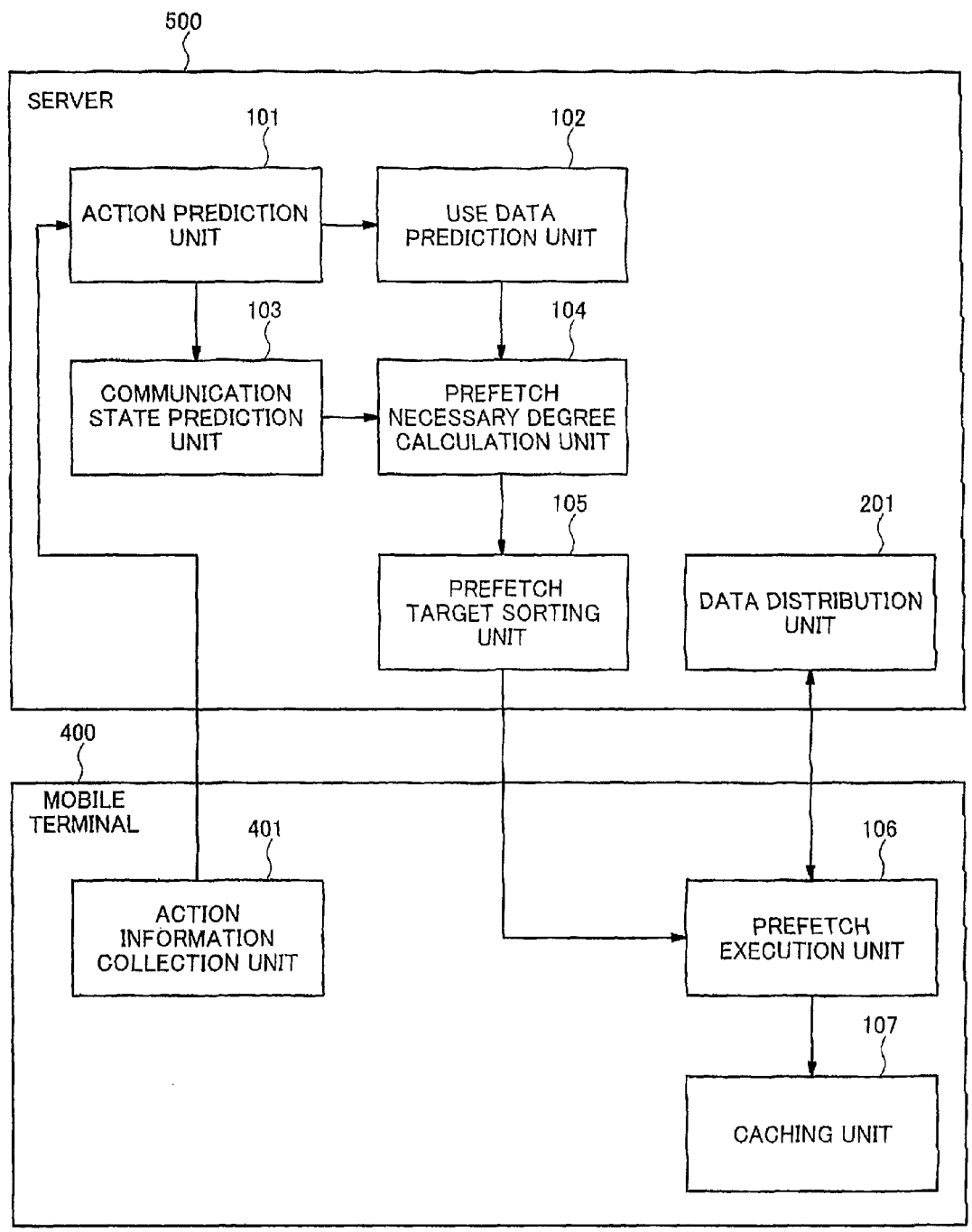
FIG. 13 is a block diagram illustrating a configuration of a third exemplary embodiment according to the present invention.

FIG. 13 is a block diagram illustrating the structure of the third exemplary embodiment according to the present invention. Referring to FIG. 13, an information processing device according to this exemplary embodiment includes a mobile terminal 400 and a server 500.

The mobile terminal 400 includes an action information collection unit 401, the prefetch execution unit 106 and the caching unit 107.

The server 500 includes the action prediction unit 101, the use data prediction unit 102, the communication state prediction unit 103, the prefetch necessary degree calculation unit 104, a prefetch target sorting unit 105 and the data distribution unit 201.

Differences with the first exemplary embodiment shown in FIG. 1 are that the action prediction unit 101, the use data prediction unit 102, the communication state prediction unit 103, the prefetch necessary degree calculation unit 104 and the prefetch target sorting unit 105 are located, not in the mobile terminal 400, but in the server 500. Furthermore, as compared with the first exemplary embodiment, there is a difference in that the action information collection unit 401 is added to the mobile terminal 400. In addition, the same components as those of the first exemplary embodiment are denoted by the same symbols.

The action information collection unit 401 of the mobile terminal 400 collects action information, such as operation histories of the mobile terminal 400 and movement histories in the past of a user thereof, and transmits them to the server 500.

Next, the entire operations of this exemplary embodiment will be described in detail with reference to FIG. 9, FIG. 13 and FIG. 14.

Figure 14:
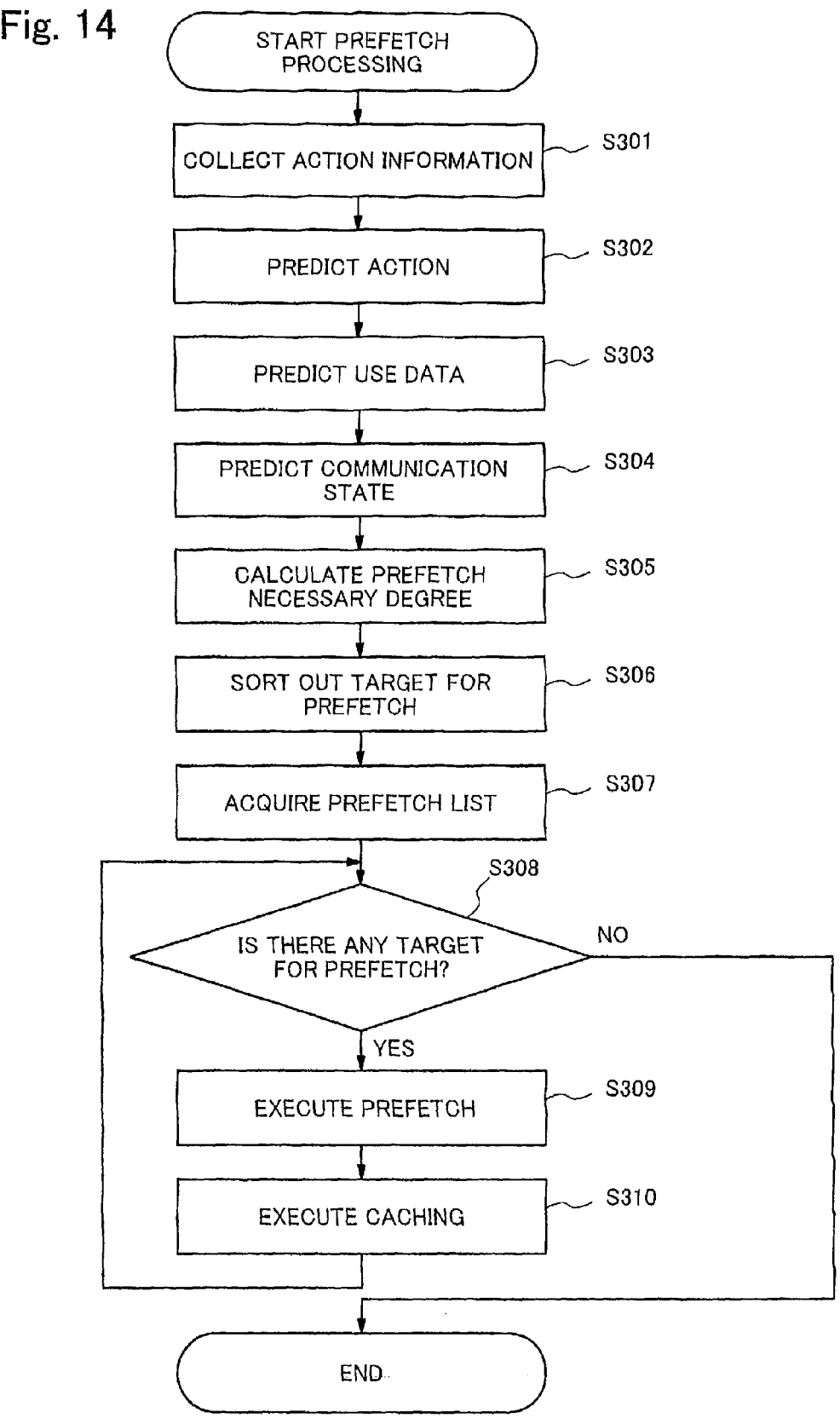
FIG. 14 is a flowchart illustrating the entire operations of a third exemplary embodiment according to the present invention.

FIG. 14 is a flowchart illustrating the entire operations of this exemplary embodiment.

First, the action information collection unit 401 of the mobile terminal 400 collects action information, such as operation histories of the mobile terminal 400 and movement histories, and transmits it to the server 500 (step S301 shown in FIG. 14).

Next, the action prediction unit 101 of the server 500 predicts actions, such as contents of future operations of the user of the mobile terminal 400 and destinations of movements thereof on the basis of the received information (step S302 shown in FIG. 14).

The following steps S303 to S306 are the same as steps S102 to S105 of the first exemplary embodiment shown in FIG. 2, and thus, the descriptions thereof are omitted.

Next, the prefetch execution unit 106 acquires an extraction list 636 shown in FIG. 9, having been created by the prefetch target sorting unit 105 (step S307). Subsequently, the prefetch execution unit 106 acquires pieces of use data corresponding to respective use data identification information included in the acquired extraction list 636, from the data distribution unit 201 of the server 200 (steps S308 to S309). Further subsequently, the prefetch execution unit 106 stores the acquired pieces of use data into the caching unit 107 (step S310).

The prefetch execution unit 106 repeats steps S308 to S310 until the completion of acquisition of all the pieces of use data which the prefetch target sorting unit 105 has determined to prefetch.

In addition, in step S307, when acquiring the extraction list 636, the prefetch execution unit 106 may not acquire it all at once, but may acquire it in plural batches. That is, the prefetch execution unit 106 may operate as follows. First, in step S307, the prefetch execution unit 106 determines information corresponding to a piece of use data to be prefetched first (for example, a piece of use data indicated by a piece of use data identification information listed at the first line of the extraction list 636). Next, the prefetch execution unit 106 acquires a piece of use data corresponding to the determined piece of use data identification information. Next, the prefetch execution unit 106 stores the acquired piece of use data into the caching unit 107 (steps S308 to S310). Next, the process flow returns to step S307, where the prefetch execution unit 106 determines a piece of use data to be prefetched next. The prefetch execution unit 106 may repeat the processes described above until the completion of acquisition of all pieces of use data.

Further, in this exemplary embodiment, the server 500 has the functions of calculation of targets for prefetch and distribution of data, but these functions may be configured so as to be allocated into a plurality of different servers. That is, the server 500 shown in FIG. 13 may be constituted by a prefetch target calculation server, and a data distribution server including the data distribution unit 201. In this case, the prefetch target calculation server includes the action prediction unit 101, the use data prediction unit 102, the communication state prediction unit 103, the prefetch necessary degree calculation unit 104 and the prefetch target sorting unit 105. Further, the data distribution server includes the data distribution unit 201.

Further, just like in the second exemplary embodiment, the prefetch planning unit 108 may be provided between the prefetch target sorting unit 105 and the prefetch execution unit 106, and the scheduling of prefetch processes may be performed by the prefetch planning unit 108.

Further, in the case where a certain application (not illustrated) of the mobile terminal 400 periodically communicates with a certain application (not illustrated) of the server 500, the action prediction unit 101 can presume a current position of the mobile terminal 400, future movement destinations, user operations and the like from the situation of the communication. In this case, this exemplary embodiment may be configured so as not to include the action information collection unit 401. Known examples of such communication include communication which allows a web application for displaying a map of the surrounding of a current position to make a request for a map image to the server 500 by handling a current position as a parameter thereof, and the like.

Alternatively, in the case where, without using any information obtained from the mobile terminal 400, from only various pieces of use data (not illustrated) stored in the server 500, such as a schedule, the action prediction unit 101 can presume a current position of the mobile terminal 400, future movement destinations, user operations and the like, this exemplary embodiment may be configured so as not to include the action information collection units 401.

A first advantageous effect of this exemplary embodiment described above is that, in addition to the advantageous effects of the first exemplary embodiment, it is possible to perform the prediction, the calculation of the degrees of importance, and further, the calculation of the necessity of prefetch regarding respective pieces of use data which become prefetch candidates with higher accuracy.

The reason thereof is that, processing has been improved by using information, regarding which the acquisition and the processing are more efficient when performed in the server 500 than when performed in the mobile terminal 400, such as congestion states of networks, traffic information regarding delay states of trains, traffic jam states of roads and the like, and link structures of Web pages on the Internet, as well as information only the server 500 possesses.

A second advantageous effect of this exemplary embodiment described above is that a more highly accurate action prediction can be made possible by using a general user action pattern resulting from a statistical calculation from action histories of a plurality of users.

The reason thereof is that, processing has been improved by concentrating action histories of a plurality of users into the server 500 from the action information collection unit 401 of each of the mobile terminals 400.

A third advantageous effect of this exemplary embodiment described above is that processing for prediction can be performed at high speed.

The reason of this is that, configuration has been improved by causing, not the mobile terminal 400 side, but the server 500 side, where, in general, the processing power is higher than that of the mobile terminal side, to perform the prediction of use data targeted for prefetch.

Fourth Exemplary Embodiment

Next, a fourth exemplary embodiment according to the present invention will be described in detail with reference to the drawings. This exemplary embodiment is an exemplary embodiment including only basic components of the present invention.

Figure 15:
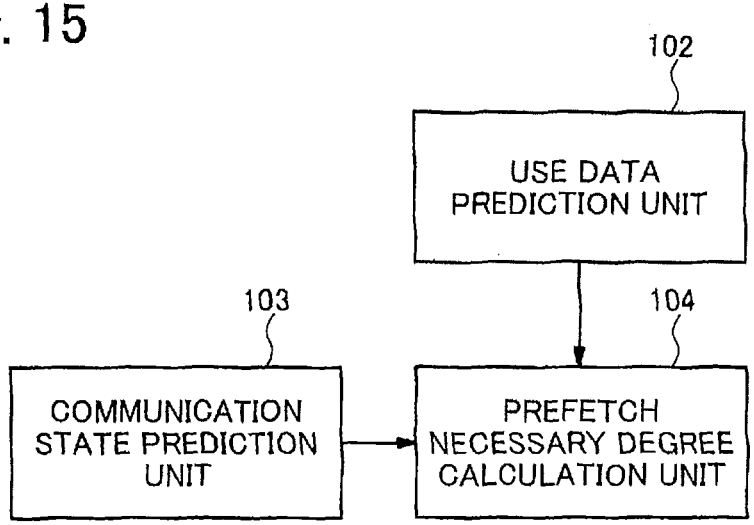
FIG. 15 is a block diagram illustrating a configuration of a fourth exemplary embodiment according to the present invention.

FIG. 15 is a block diagram illustrating the structure of the fourth exemplary embodiment according to the present invention. Referring to FIG. 15, the information processing device according to this exemplary embodiment includes the use data prediction unit 102, the communication state prediction unit 103 and the prefetch necessary degree calculation unit 104.

The use data prediction unit 102 predicts pieces of use data to be used by a terminal so as to correlate the pieces of use data with action plan information resulting from prediction of the actions of a user of the terminal.

The communication state prediction unit 103 predicts communication states in the situation indicated by the action plan information on the basis of the action plan information and communication environment information having been given in advance.

On the basis of information regarding the predicted pieces of use data and information regarding the predicted communication states, the prefetch necessary degree calculation unit 104 calculates the prefetch necessary degrees regarding the respective pieces of use data.

An advantageous effect of this exemplary embodiment described above is that it is possible to obtain an appropriate determination criterion which enables sorting of more pieces of data each having a high degree of necessity of prefetch more promptly.

The reason thereof is that, processing has been improved such that the prefetch necessary degree calculation unit 104 calculates the prefetch necessary degrees regarding respective pieces of use data on the basis of information regarding pieces of use data having been predicted by the use data prediction unit 102 and information regarding communication states having been predicted by the communication state prediction unit 103.

Figure 16:
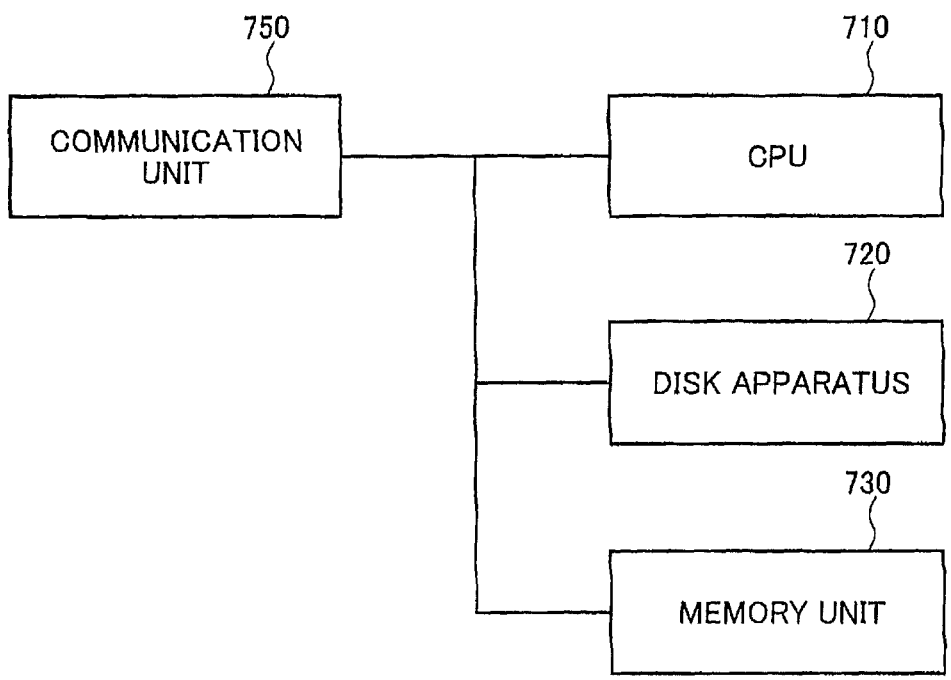
FIG. 16 is a block diagram illustrating a configuration of an information processing device which causes a computer to execute prescribed processing by using a program according to the present invention.

The information processing device according to each of the above-described exemplary embodiments may be an information processing device constituted by a general-purpose computer shown in FIG. 16. FIG. 16 is a block diagram illustrating the configuration of an information processing device which causes a computer to execute prescribed processing by using a program according to the present invention.

Referring to FIG. 16, the information processing device includes a central processing unit (CPU) 710, a disk apparatus 720, a memory unit 730 and a communication unit 750.

The action prediction unit 101, the use data prediction unit 102, the communication state prediction unit 103, the prefetch necessary degree calculation unit 104, the prefetch target sorting unit 105, the prefetch execution unit 106, the prefetch planning unit 108, the prefetch execution unit 109, the data distribution unit 201 and the action information collection unit 401 of each of the exemplary embodiments correspond to the CPU 710, the disk apparatus 720 and the memory unit 730. Further, the caching unit 107 of each of the exemplary embodiments corresponds to the memory unit 730.

The CPU 710 loads the program stored in the disk apparatus 720 into the memory unit 730. Further, on the basis of the loaded program, the CPU 710 executes the same processes as those of the action prediction unit 101, the use data prediction unit 102, the communication state prediction unit 103, the prefetch necessary degree calculation unit 104, the prefetch target sorting unit 105, the prefetch execution unit 106, the prefetch planning unit 108, the prefetch execution unit 109, the data distribution unit 201 and the action information collection unit 401 which have been described in each of the above-described exemplary embodiments.

The disk apparatus 720 stores the program therein.

The memory unit 730 stores the loaded program therein. Further, the memory unit 730 stores use data therein just like the caching unit 107. Moreover, the memory unit 730 may store therein the action plan list 630, the use data list 631, the use data list 632, the communication state list 633, the prefetch necessary degree list 634, the decision table 635, the extraction list 636 and the planning list 637.

The communication unit 750 is included in the action prediction unit 101, the prefetch target sorting unit 105, the prefetch execution unit 106, the data distribution unit 201 and the action information collection unit 401.

Figure 17:
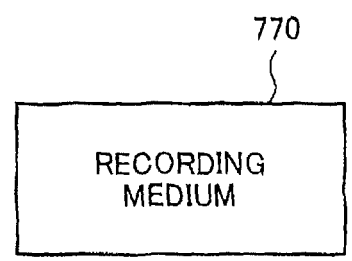
FIG. 17 is a figure showing an example of a recording medium in which a program of the present invention is recorded.

FIG. 17 is a diagram illustrating an example of a recording medium (storing medium) 770 which records (stores) a program. The recording medium 770 is a non-volatile recording medium storing information permanently. The recording medium 770 may be a volatile recording medium storing information temporarily. The recording medium 770 stores the program (software) causing the CPU 710 to execute operations shown in, for example, FIG. 2, FIG. 11, and FIG. 14. The recording medium 770 may further store any program and data.

The recording medium 770 storing codes of the program (software) may be supplied to the computer 810, and the CPU 710 may read and perform the codes of the program stored on the recording medium 770, The CPU 710 may store the codes in the memory unit 730. Each of the exemplary embodiments includes an exemplary embodiment of the recording medium 770 storing temporarily or permanently the program executed by the CPU 710.

Hereinbefore, the present invention has been described with reference to the exemplary embodiments thereof, but the present invention is not limited to the above-described exemplary embodiments. Various changes which can be understood by those skilled in the art can be made on the configuration and the details of the present invention within the scope of the present invention.

This application is based upon and claims the benefit of priority from Japanese Patent Application No. 2010-107073, filed on May 7, 2010, the disclosure of which is incorporated herein in its entirety by reference.

INDUSTRIAL APPLICABILITY

The present invention can be applied to mobile phones, personal computers, vehicle terminals and the like, which browse mails stored in servers, as well as indicate maps and retrieve information regarding shops around a current position by referring to map data stored in relevant servers.

Moreover, the present invention can be also applied to business terminals or the like for administrative tasks using communication with relevant servers, such as a stock searching.

Furthermore, the present invention can be also applied to portable reproducing devices and the like, which acquire and use music contents and/or image contents or the like from relevant servers.

DESCRIPTION OF THE REFERENCE NUMERALS

100 Mobile terminal
200 Server
300 Mobile terminal
400 Mobile terminal
500 Server
101 Action prediction unit
102 use data prediction unit
103 Communication state prediction unit
104 Prefetch necessary degree calculation unit
105 Prefetch target sorting unit
106 Prefetch execution unit
107 Caching unit
108 Prefetch planning unit
109 Prefetch execution unit
201 Data distribution unit
401 Action information collection unit
630 Action plan list
631 Use data list
632 Use data list
633 Communication state list
634 Prefetch necessary degree list
635 Decision table
636 Extraction list
637 Planning list
710 CPU
720 Disk Apparatus
730 Memory Unit
750 Communication Unit
770 Recording Medium

The invention claimed is:

1. An information processing device comprising:
a use data prediction unit which predicts use data that is assumed to be used by a terminal in the future on a basis of action plan information resulting from prediction of an action of a user of the terminal, and outputs use data identification information for identifying the predicted use data;
a communication state prediction unit which predicts a communication state indicating at least time proportion within a range between corresponding time and a location of the communication available in the terminal to a network in a situation indicated by the action plan information on a basis of the action plan information and communication environment information regarding a communication environment of the terminal, and outputs information regarding the predicted communication state; and
a prefetch necessary degree calculation unit which calculates a prefetch necessary degree regarding each of the use data on a basis of the use data identification information and the information regarding the predicted communication state.

2. The information processing device according to claim 1, wherein the use data prediction unit calculates a degree of importance regarding each of the use data on a basis of a prescribed criterion.

3. The information processing device according to claim 2, wherein the prefetch necessary degree calculation unit calculates a prefetch necessary degree regarding each of the use data on a basis of information regarding the predicted use data, the information regarding the predicted communication state and the calculated degree of importance.

4. The information processing device according to any of claim 1, further comprising a prefetch target sorting unit which sorts out the use data which is prefetched, on a basis of the prefetch necessary degree and the prescribed determination criterion.

5. The information processing device according to claim 4, further comprising a prefetch execution unit which acquires the use data which is prefetched.

6. The information processing device according to claim 5, wherein the prefetch execution unit acquires the use data which is prefetched, on the basis of the prefetch necessary degree regarding each of the use data.

7. The information processing device according to claim 5, wherein the prefetch execution unit acquires the use data having been sorted out by the prefetch target sorting unit.

8. The information processing device according to claim 4, further comprising an action prediction unit which creates action plan information on a basis of prediction reference information which includes information available for predicting an action.

9. The information processing device according to claim 8, further comprising an action information collection unit which collects at least one of an operation history and a movement history of the terminal as the prediction reference information.

10. The information processing device according to claim 8, further comprising:
a prefetch planning unit which plans an acquisition time when the prefetch is performed for the use data, on a basis of the predicted communication state in a situation indicated by the action plan information.

11. The information processing device according to claim 10, wherein the prefetch planning unit plans the acquisition time on a basis of update timing for the use data.

12. A terminal comprising:
a use data prediction unit which predicts use data that is assumed to be used by the terminal in the future on a basis of action plan information resulting from prediction of an action of a user of the terminal, and outputs use data identification information for identifying the predicted use data;
a communication state prediction unit which predicts a communication state indicating at least time proportion within a range between corresponding time and a location of the communication available in the terminal to a network in a situation indicated by the action plan information on a basis of the action plan information and communication environment information regarding a communication environment of the terminal, and outputs information regarding the predicted communication state; and
a prefetch necessary degree calculation unit which calculates a prefetch necessary degree regarding each of the use data on a basis of the use data identification information and the information regarding the predicted communication state.

13. The terminal according to claim 12, wherein the use data prediction unit calculates a degree of importance regarding each of the use data on a basis of a prescribed criterion.

14. The terminal according to claim 13, wherein the prefetch necessary degree calculation unit calculates a prefetch necessary degree regarding each of the use data on a basis of information regarding the predicted use data, the information regarding the predicted communication state and the calculated degree of importance.

15. A server comprising:
a use data prediction unit which predicts use data that is assumed to be used by a terminal in the future on a basis of action plan information resulting from prediction of an action of a user of the terminal, and outputs use data identification information for identifying the predicted use data;
a communication state prediction unit which predicts a communication state indicating at least time proportion within a range between corresponding time and a location of the communication available in the terminal to a network in a situation indicated by the action plan information on a basis of the action plan information and communication environment information regarding a communication environment of the terminal, and outputs information regarding the predicted communication state; and
a prefetch necessary degree calculation unit which calculates a prefetch necessary degree regarding each of the use data on a basis of the use data identification information and the information regarding the predicted communication state.

16. The server according to claim 15, wherein the use data prediction unit calculates a degree of importance regarding each of the use data on a basis of a prescribed criterion.

17. The server according to claim 16, wherein the prefetch necessary degree calculation unit calculates a prefetch necessary degree regarding each of the use data on the basis of information regarding the predicted use data, the information regarding the predicted communication state and the calculated degree of importance.

18. A method for data transfer, said method comprising:
predicting use data that is assumed to be used by a terminal in the future on a basis of action plan information resulting from prediction of an action of a user of the terminal, and outputting use data identification information for identifying the predicted use data;
predicting a communication state indicating at least time proportion within a range between corresponding time and a location of the communication available in the terminal to a network in a situation indicated by the action plan information on a basis of the action plan information and communication environment information regarding a communication environment of the terminal, and outputting information regarding the predicted communication state; and
calculating a prefetch necessary degree regarding each of the use data on a basis of the use data identification information and the information regarding the predicted communication state.

19. The method for data transfer, according to claim 18, further comprising calculating a degree of importance regarding each of the use data on a basis of a prescribed criterion.

20. The method for data transfer, according to claim 19, wherein the calculating a prefetch necessary degree regarding each of the use data includes calculating a prefetch necessary degree regarding each of the use data on a basis of information regarding the predicted use data, the information regarding the predicted communication state and the calculated degree of importance.

21. The method for data transfer, according to any of claim 18, further comprising sorting out the use data which is prefetched, on a basis of the prefetch necessary degree and the prescribed determination criterion.

22. The method for data transfer, according to claim 21, further comprising acquiring the use data which is prefetched.

23. The method for data transfer, according to claim 22, wherein acquiring the use data targeted for prefetch includes acquiring the use data which is prefetched, on a basis of the prefetch necessary degree regarding each of the use data.

24. The method for data transfer, according to claim 22, wherein the acquiring the use data targeted for prefetch includes acquiring the use data having been sorted out in the sorting out the use data which is prefetched.

25. The method for data transfer, according to any of claim 21, further comprising creating action plan information on a basis of prediction reference information which includes information available for predicting an action.

26. The method for data transfer, according to claim 25, further comprising collecting at least one of an operation history and a movement history of the terminal as the prediction reference information.

27. The method for data transfer, according to claim 25, further comprising planning an acquisition time for the use data which performed the prefetch on a basis of the predicted communication state in the situation indicated by the action plan information.

28. The method for data transfer, according to claim 27, wherein in the planning, an acquisition time for the use data includes planning the acquisition time on a basis of update timing for the use data.

29. A non-transitory computer-readable recording medium in which a program causes a computer to execute a processing comprising:
- a process of predicting use data that is assumed to be used by a terminal in the future on the basis of action plan information resulting from prediction of an action of a user of the terminal, and outputting use data identification information for identifying the predicted use data;
- a process of predicting a communication state indicating at least time proportion within a range between corresponding time and a location of the communication available in the terminal to a network in a situation indicated by the action plan information on the basis of the action plan information and communication environment information regarding a communication environment of the terminal, and outputting information regarding the predicted communication state; and
- a process of calculating a prefetch necessary degree regarding each of the use data on a basis of the use data identification information and the information regarding the predicted communication state.

30. The program causing a computer to execute processing, according to claim 29, wherein the processing further comprises a process of calculating a degree of importance regarding each of the use data on a basis of a prescribed criterion.

31. The program causing a computer to execute processing, according to claim 30, wherein the process of calculating a prefetch necessary degree regarding each of the use data includes calculating a prefetch necessary degree regarding each of the use data on a basis of information regarding the predicted use data, the information regarding the predicted communication state and the calculated degree of importance.

32. An information processing device comprising:
- use data prediction means for predicting use data that is assumed to be used by a terminal in the future on the basis of action plan information resulting from prediction of an action of a user of the terminal, and outputting use data identification information for identifying the predicted use data;
- communication state prediction means for predicting a communication state indicating at least time proportion within a range between corresponding time and a location of the communication available in the terminal to a network in a situation indicated by the action plan information on the basis of the action plan information and communication environment information regarding a communication environment of the terminal, and outputting information regarding the predicted communication state; and
- prefetch necessary degree calculation means for calculating a prefetch necessary degree regarding each of the use data on the basis of the use data identification information and the information regarding the predicted communication state.

* * * * *